United States Patent
Wang et al.

(10) Patent No.: US 8,319,934 B2
(45) Date of Patent: Nov. 27, 2012

(54) DISPLAY MOTHERBOARD WITH PHOTO SUPPORTING MEMBER OVERLAPPING THE CUTTING LINES AND DISPLAY PANEL

(75) Inventors: Shu-Chih Wang, Hsin-Chu (TW); Che-Yao Wu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 526 days.

(21) Appl. No.: 12/512,422

(22) Filed: Jul. 30, 2009

(65) Prior Publication Data
US 2010/0045921 A1  Feb. 25, 2010

(30) Foreign Application Priority Data
Aug. 22, 2008  (TW) ................ 97132280 A

(51) Int. Cl.
*G02F 1/1333* (2006.01)
*G02F 1/1339* (2006.01)
*G02F 1/1341* (2006.01)
*G02F 1/1345* (2006.01)

(52) U.S. Cl. ........ 349/158; 349/153; 349/154; 349/155; 349/156; 349/157; 349/189; 349/190

(58) Field of Classification Search .......... 349/153–156, 349/158, 189–190
See application file for complete search history.

(56) References Cited

U.S. PATENT DOCUMENTS

| | | | |
|---|---|---|---|
| 5,808,719 A * | 9/1998 | Fujiwara et al. .............. | 349/157 |
| 6,010,384 A | 1/2000 | Nishino et al. | |
| 6,222,603 B1 | 4/2001 | Sakai et al. | |
| 6,326,225 B1 * | 12/2001 | Yamazaki et al. .............. | 438/30 |
| 6,577,367 B2 * | 6/2003 | Kim .............................. | 349/139 |
| 6,628,365 B1 | 9/2003 | Park et al. | |
| 6,646,709 B2 * | 11/2003 | Matsumoto .................... | 349/156 |
| 6,753,933 B2 * | 6/2004 | Cirkel et al. ................... | 349/23 |
| 6,844,911 B2 | 1/2005 | Lee | |
| 7,675,602 B2 | 3/2010 | Yamanaka | |
| 8,054,437 B2 * | 11/2011 | Okada et al. .................. | 349/153 |
| 2003/0053021 A1 * | 3/2003 | Lee ............................... | 349/153 |
| 2007/0195255 A1 | 8/2007 | Cho et al. | |

FOREIGN PATENT DOCUMENTS

| | | |
|---|---|---|
| JP | 58-65419 | 4/1983 |
| JP | H04-020927 | 1/1992 |
| JP | H11-064864 | 3/1999 |

(Continued)

OTHER PUBLICATIONS

English language translation of abstract and pertinent parts of JP 2007-264242 (published Oct. 11, 2007).

(Continued)

*Primary Examiner* — Hoan C Nguyen
(74) *Attorney, Agent, or Firm* — McClure, Qualey & Rodack, LLP

(57) ABSTRACT

A display motherboard includes a first substrate, a second substrate, a plurality of cutting lines, and at least one photo supporting member. The second substrate is opposite the first substrate. The cutting lines are disposed on the first substrate and the second substrate, wherein the cutting lines separate the first substrate and the second substrate into at least one display panel. The photo supporting member is located between the first substrate and the second substrate, wherein the photo supporting member overlaps the cutting lines, and the photo supporting member has a bar shape surrounding the display panel.

11 Claims, 5 Drawing Sheets

FOREIGN PATENT DOCUMENTS

| | | | |
|---|---|---|---|
| JP | 2003-107491 A | | 4/2003 |
| JP | 2007-264242 | | 10/2007 |
| KR | 2000007876 | * | 7/1998 |
| KR | 20030058616 A | | 7/2003 |
| TW | 493096 | | 7/2002 |
| TW | 200801676 A | | 1/2008 |

OTHER PUBLICATIONS

English language translation of abstract and pertinent parts of JP 58-65419 (published Apr. 19, 1983).

English language translation of abstract of H04-020927.

English language translation of abstract of H11-064864.

English translation of abstract and pertinent parts of TW 493096.

English translation of abstract and pertinent parts of TW 200801676 A.

English translation of abstract of JP 2003-107491 A.

English translation of abstract of KR 20030058616 A.

* cited by examiner

DISPLAY MOTHERBOARD WITH PHOTO SUPPORTING MEMBER OVERLAPPING THE CUTTING LINES AND DISPLAY PANEL

RELATED APPLICATIONS

This application claims priority to Taiwan Application Serial Number 97132280, filed Aug. 22, 2008, which is herein incorporated by reference.

BACKGROUND

1. Field of Invention

The present disclosure relates to liquid crystal cells. More particularly, the present disclosure relates to nominal manufacturing methods or post manufacturing processing of the liquid crystal cells.

2. Description of Related Art

Liquid crystal displays have many advantages, such as high definition, small volume, lightweight, low voltage drive, low consumption of power, a broad range of applications, etc. Therefore, liquid crystal displays are already broadly used in consumer electronic devices or computer products, such as portable televisions, cellular phones, camcorders, laptop computers, desktop displays, projection televisions, etc., thereby becoming the main stream for displays.

"Display panel" is one of the critical parts of a liquid crystal display. Conventionally, the manufacturers may separate a glass substrate into a plurality of panel units and then perform a back end of line (BEOL) process to produce a display panel. However, as the quality demand for liquid crystal displays increases, the foregoing processes have to face a series of challenges.

For example, traditionally, the manufacturers may create a cutting line or a median crack on the surface of the glass substrate first, and then the glass substrate is separated into a plurality of panel units by separation along the median crack. However, since the glass substrate becomes thinner today, the glass substrate can no longer provide enough mechanical strength to form the median crack, thereby causing bad separation.

SUMMARY

According to one embodiment of the present invention, a display motherboard includes a first substrate, a second substrate, a plurality of cutting lines, and at least one photo supporting member. The second substrate is opposite the first substrate. The cutting lines are disposed on the first substrate and the second substrate, wherein the cutting lines separate the first substrate and the second substrate into at least one display panel. The photo supporting member is located between the first substrate and the second substrate, wherein the photo supporting member overlaps the cutting lines, and the photo supporting member has a bar shape surrounding the display panel.

According to another embodiment of the present invention, a display panel includes a first substrate, a second substrate, and at least one photo supporting member. The second substrate is opposite the first substrate. The photo supporting member is located between the first substrate and the second substrate, wherein at least one of the first substrate and the second substrate has at least one edge overlapping the photo supporting member, and the photo supporting member has a bar shape surrounding the first substrate and the second substrate.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
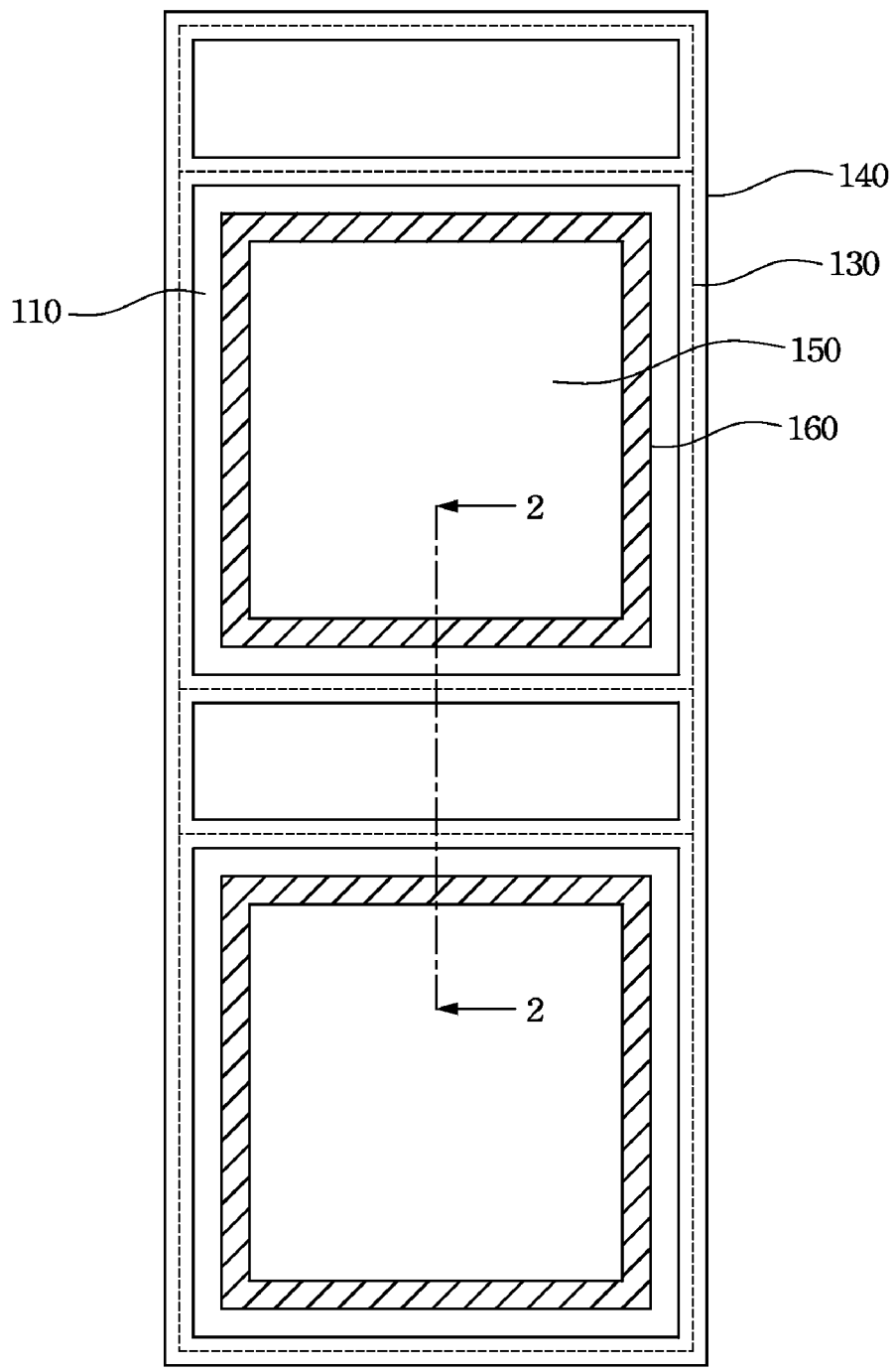
FIG. 1 is a top view of a display motherboard according to one embodiment of the present invention.
Figure 2:
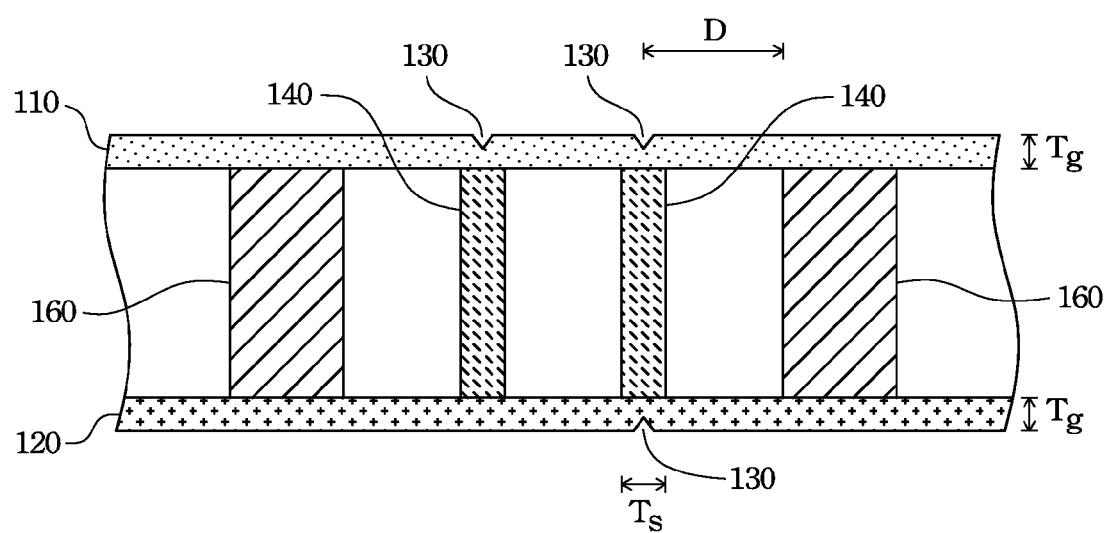
FIG. 2 is a cross sectional view taken along line 2 of FIG. 1.

FIG. 1 is a top view of a display motherboard according to one embodiment of the present invention. FIG. 2 is a cross sectional view taken along line 2 of FIG. 1. A display motherboard 100 includes a first substrate 110, a second substrate 120, a plurality of cutting lines 130, and at least one photo supporting member 140. The second substrate 120 is opposite the first substrate 110. The cutting lines 130 are disposed on the first substrate 110 and the second substrate 120, wherein the cutting lines 130 separate the first substrate 110 and the second substrate 120 into at least one display panel 150. The photo supporting member 140 is located between the first substrate 110 and the second substrate 120, wherein the photo supporting member 140 overlaps the cutting lines 130, and the photo supporting member 140 has a bar shape surrounding the display panel 150.

The manufacturers may press a wheel cutter tightly against the first substrate 110 and/or the second substrate 120 and move the wheel cutter alone the photo supporting member 140 to form the cutting lines 130 with median cracks. Even if the first substrate 110 and/or the second substrate 120 may be thin, the photo supporting member 140 can support the first substrate 110 and/or the second substrate 120, such that the median cracks can be formed in the first substrate 110 and/or the second substrate 120. In the present embodiment, the first substrate 110 and the second substrate 120 each has a thickness Tg of about 30-600 μm. Furthermore, the photo supporting member 140 has a width Ts of about 60-600 μm.

The terms "about" as used herein may be applied to modify any quantitative representation which could permissibly vary without resulting in a change in the basic function to which it is related. For example, the photo supporting member 140 as disclosed herein having a width Ts of about 60-600 μm may permissibly have a width of less than 60 μm or greater than 600 μm within the scope of the invention if its supporting capability is not materially altered.

In the present embodiment, the photo supporting member 140 may be formed on the first substrate 110, and the top of the photo supporting member 140 may be against the second substrate 120. Alternatively, the photo supporting member 140 may be formed on the second substrate 120, and the top of the photo supporting member 140 may be against the first substrate 110.

Figure 3:
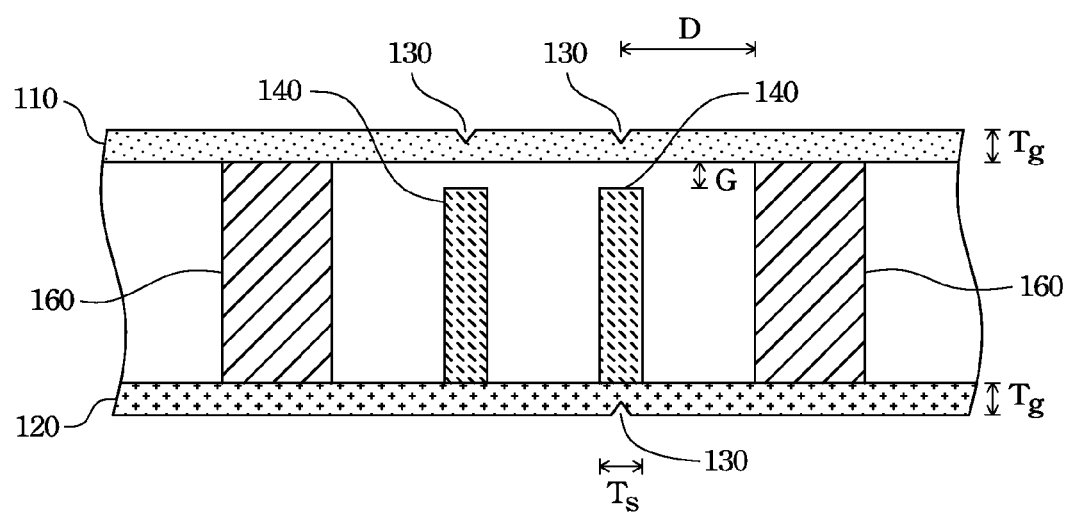
FIG. 3 is a cross sectional view of a display motherboard according to another embodiment of the present invention.

It is appreciated that many other types of photo supporting member may be used as the photo supporting member 140. For example, the top of the photo supporting member 140 shown in FIG. 3 may be separated from the first substrate 110 at a desired distance G, e.g. less than about 5 μm.

The material of the photo supporting member 140 may be the same as the material of a photo spacer located in an active area, the material of a black matrix, the material of an overcoat layer, or the material of a color resist layer. Furthermore, the photo supporting member 140 may be formed at the same time as the photo spacer located in the active area, the black matrix, the overcoat layer, or the color resist layer.

It is appreciated that the photo supporting member 140 may be formed independently as well. Alternatively, the photo supporting member 140 may be the photo spacer, the black matrix, the overcoat layer, the color resist layer, or a combination thereof.

As shown in FIG. 1, a plurality of the photo supporting members 140 may constitute a closed rectangular ring without any opening therein. Furthermore, each of the display panels 150 may include a sealant 160 located between the first substrate 110 and the second substrate 120. The sealant 160 may be disposed in the closed rectangular ring constituted by the photo supporting members 140, and this sealant 160 may be a closed rectangular ring without any injection hole therein as well. Since the photo supporting member 140 does not have any opening therein, the photo supporting member 140 can fully support the wheel cutter when the wheel cutter forms the cutting lines 130. In manufacturing, the manufacturers may fill the display panel 150 with liquid crystal by one-drop-filling (ODF).

In FIG. 1 and the related drawings, dashed lines represent the cutting lines 130 which have not been separated yet. Furthermore, although the sealant 160 is covered by the first substrate 110 in FIG. 1 and the related drawings, the sealant 160 is shown in the drawings with oblique lines in order to illustrate the location of the sealant 160.

It is appreciated that many other types of photo supporting member may be used as the photo supporting member 140. For instance, FIG. 4 illustrates a plurality of the photo supporting members 140 are arranged in a rectangular ring having an opening 144.

Figure 4:
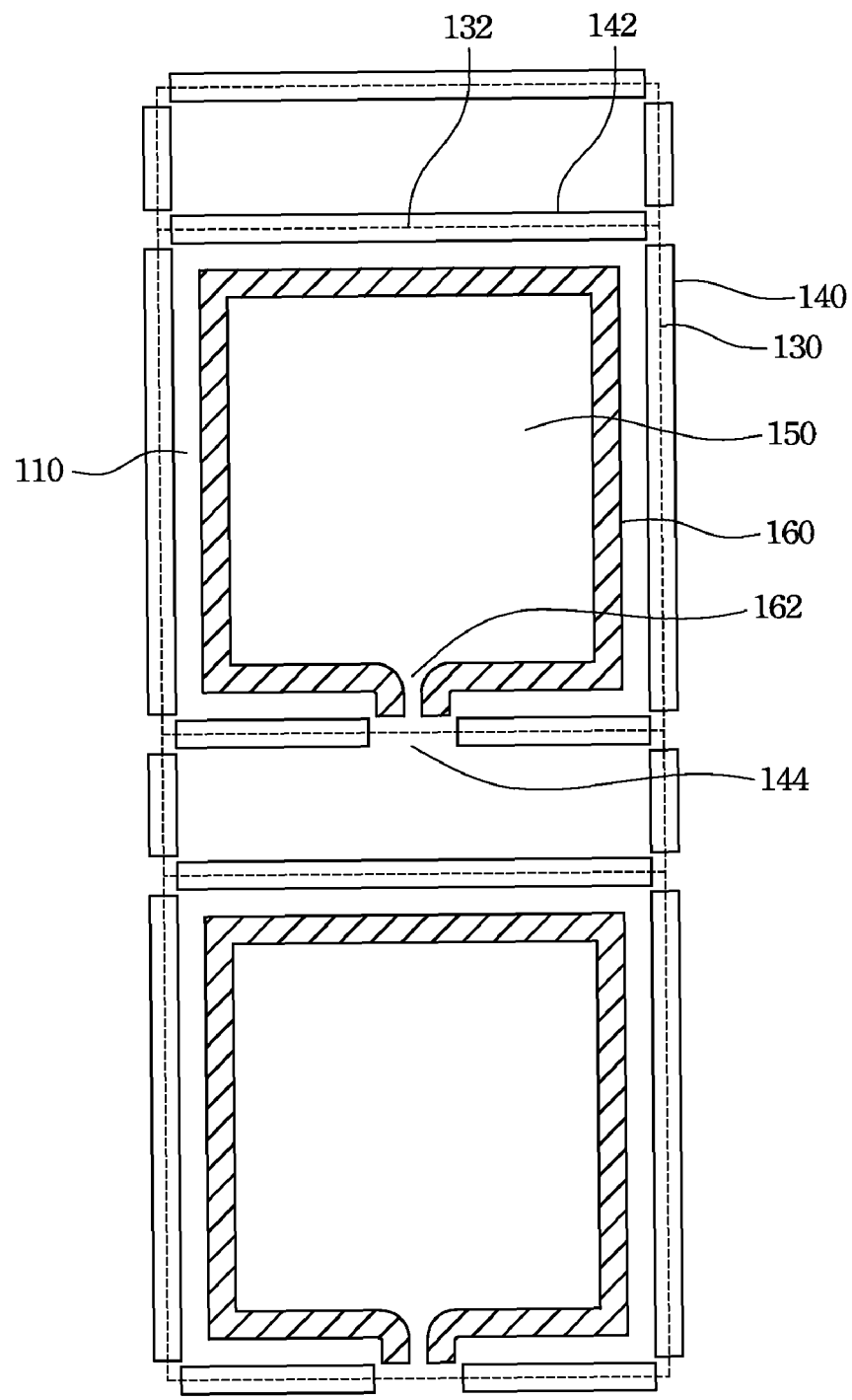
FIG. 4 is a top view of a display motherboard according to another embodiment of the present invention.

Specifically, the sealant 160 of FIG. 4 may have an injection hole 162 opposite the opening 144 of the rectangular ring. In manufacturing, the manufacturers may inject liquid crystal into the display panel 150 through the opening 144 and the injection hole 162.

In the present embodiment, each of the photo supporting members 140 may have a bar shape, and the length of the photo supporting members 140 may be substantially the same as the length of the respective cutting lines 130 such that the wheel cutter can be fully supported when forming the cutting lines 130. For example, the length of the photo supporting member 142 may be substantially the same as the length of the cutting line 132.

The terms "substantially" as used herein may be applied to modify any quantitative representation which could permissibly vary without resulting in a change in the basic function to which it is related. For example, the length of the photo supporting members 140 as disclosed herein may permissibly be less than or greater than the length of the respective cutting lines 130 within the scope of the invention if their supporting capability is not materially altered.

Another aspect of the present invention is to provide a method for cutting the display motherboard. According to one embodiment of the present invention, the method includes the following steps (The steps are not recited in the sequence in which the steps are performed. That is, unless the sequence of the steps is expressly indicated, the sequence of the steps is interchangeable, and all or part of the steps may be simultaneously, partially simultaneously, or sequentially performed):

(1) providing the display motherboard 100 as shown in FIG. 1 or FIG. 4; and (2) cutting the first substrate 110 and the second substrate 120 along the cutting lines 130.

In the step (2), the manufacturers may hit the first substrate 110 and the second substrate 120 by a breaking bar, and then the first substrate 110 and the second substrate 120 will be broken along the cutting lines 130. However, since the precision of the hitting step is not good enough, the cutting lines 130 and the sealant 160 may be separated at a desired distance to prevent the breaking bar from hitting the sealant 160.

Furthermore, the manufacturers may cut the first substrate 110 and/or the second substrate 120 direct by the wheel cutter without hitting when the thickness Tg of the first substrate 110 and/or the second substrate 120 is about 30-600 μm. Since the hitting step need not to be performed, the distance D between the cutting lines 130 and the sealant 160 may be decreased. That is, the non-active area located outside the active area which is surrounded by the sealant 160 can be increased. In the present embodiment, the distance D between the cutting lines 130, i.e. the photo supporting member(s) 140, and the sealant 160 may be about 0-10 mm.

Figure 5:
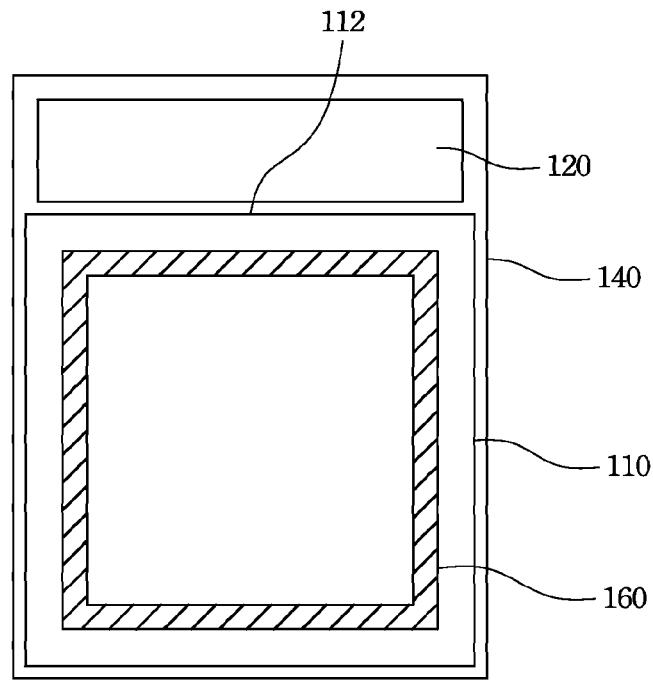
FIG. 5 is a top view of a display panel cut from the display motherboard of FIG. 1.
Figure 6:
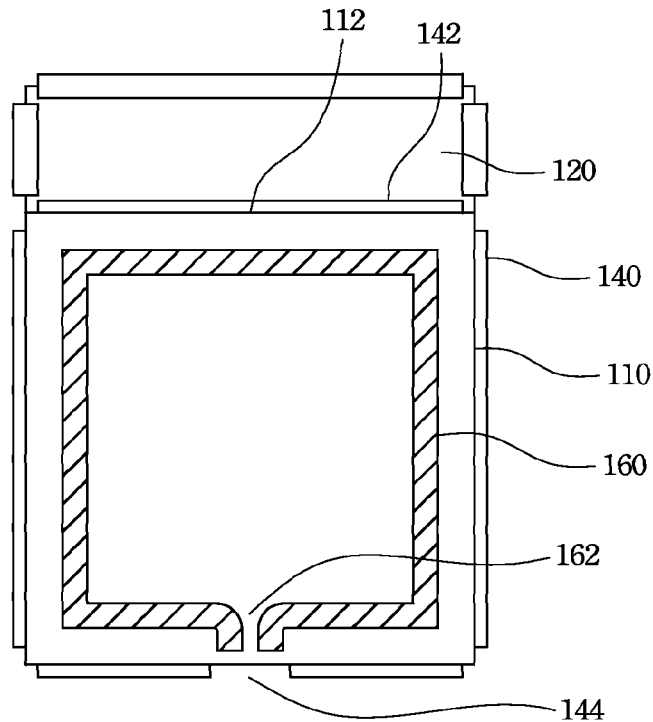
FIG. 6 is a top view of a display panel cut from the display motherboard of FIG. 4.

Another aspect of the present invention is to provide a display panel cut from the above-mentioned display motherboard. The following will disclose two embodiments (as shown in FIGS. 5-6) to illustrate the display panel. In the following statements, the structural connections and size described before are not repeated hereinafter, and only further information is supplied thereto.

FIG. 5 is a top view of a display panel 155 cut from the display motherboard 100 of FIG. 1. The display panel 155 includes a first substrate 110, a second substrate 120, and at least one photo supporting member 140. The second substrate 120 is opposite the first substrate 110. The photo supporting member 140 is located between the first substrate 110 and the second substrate 120, wherein at least one of the first substrate 110 and the second substrate 120 has at least one edge overlapping the photo supporting member 140, and the photo supporting member 140 has a bar shape surrounding the first substrate 110 and the second substrate 120.

As shown in FIG. 5, a plurality of the photo supporting members 140 may constitute a closed rectangular ring surrounding the first substrate 110 and the second substrate 120. That is, the photo supporting members 140 may overlap all of the edges of the first substrate 110 and the second substrate 120. For example, the photo supporting members 140 overlap the edge 112 of the first substrate 110.

FIG. 6 is a top view of a display panel 155 cut from the display motherboard 100 of FIG. 4. The difference between FIG. 6 and FIG. 5 is that: each of the photo supporting members 140 shown in FIG. 6 has a bar shape, and the length of the photo supporting members 140 is substantially the same as the length of the respective edges. For example, the length of the photo supporting member 142 is substantially the same as the length of the edge 112 of the first substrate 110.

A plurality of working examples are disclosed below. In those working examples, a series of tests were run to deter mine whether a wheel cutter can form median cracks in the first substrate and the second substrate when there is a photo supporting member disposed between the first substrate and the second substrate. The parameters described before are not repeated hereinafter, and only further information is supplied thereto.

In each working example, the photo supporting member was formed on the first substrate first, and then the second substrate was combined with the first substrate. Then, a wheel cutter was pressed tightly against and moved on the first substrate and the second substrate in order. Table 1 lists the parameters of each working example. Table 2 lists the test result of each working example.

TABLE 1

| Working Example | Thickness of First Substrate (mm) | Thickness of Second Substrate (mm) | Width of Photo Supporting Member (μm) | Force Applied to First/Second Substrate by Wheel Cutter (N) |
|---|---|---|---|---|
| 1 | 0.5 | 0.5 | 400 | 10 |
| 2 | 0.5 | 0.5 | 600 | 10 |
| 3 | 0.1 | 0.1 | 200 | 4 |
| 4 | 0.1 | 0.1 | 200 | 5 |
| 5 | 0.1 | 0.1 | 400 | 4 |
| 6 | 0.1 | 0.1 | 400 | 6 |

TABLE 2

| | Working Example | | | | | |
|---|---|---|---|---|---|---|
| | 1 | 2 | 3 | 4 | 5 | 6 |
| First Substrate | ◯ | ◯ | ◯ | ◯ | ◯ | ◯ |
| Second Substrate | ◯ | ◯ | ◯ | ◯ | ◯ | ◯ |

◯: with median crack(s)
X: without median crack(s)

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display motherboard comprising:
   a first substrate;
   a second substrate opposite the first substrate;
   a plurality of cutting lines disposed on the first substrate and the second substrate, wherein the cutting lines separate the first substrate and the second substrate into at least one display panel;
   at least one photo supporting member located between the first substrate and the second substrate, wherein the photo supporting member overlaps the cutting lines, and the photo supporting member has a bar shape defining a surrounding region; and
   at least one sealant located between the first substrate and the second substrate and in the region, wherein the sealant is separated from the photo supporting member.

2. The display motherboard of claim 1, wherein the photo supporting member is formed on the first substrate, and the top of the photo supporting member is against the second substrate.

3. The display motherboard of claim 1, wherein the photo supporting member is formed on the second substrate, and the top of the photo supporting member is against the first substrate.

4. The display motherboard of claim 1, wherein a plurality of the photo supporting members constitute a closed rectangular ring.

5. The display motherboard of claim 1, wherein a plurality of the photo supporting members are arranged in a rectangular ring having an opening.

6. The display motherboard of claim 5, wherein the sealant is located in the rectangular ring, and the sealant comprises an injection hole opposite the opening of the rectangular ring.

7. The display motherboard of claim 6, wherein the distance between the photo supporting members and the sealant is about 0-10 mm.

8. The display motherboard of claim 1, wherein the photo supporting member has a width of about 60-600 μm.

9. The display motherboard of claim 1, wherein the first substrate and the second substrate each has a thickness of about 30-600 μm.

10. The display motherboard of claim 1, wherein the length of the photo supporting member and the length of the cutting lines are substantially the same.

11. The display motherboard of claim 1, wherein the photo supporting member is a photo spacer, a black matrix, an overcoat layer, a color resist layer, or a combination thereof.

* * * * *